Figure 1:
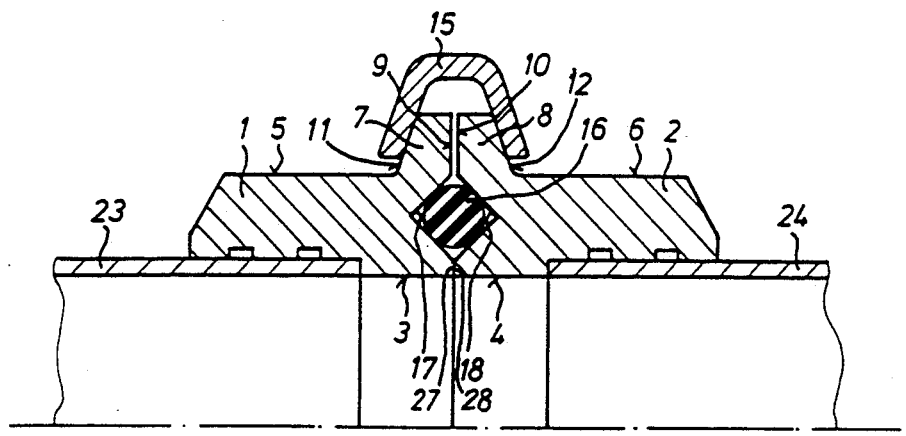

United States Patent [19]

Baarfüsser et al.

[11] Patent Number: 4,900,063
[45] Date of Patent: Feb. 13, 1990

[54] CLAMPING CONNECTION UNIT

[75] Inventors: Johann Baarfüsser, Munich; Clemens Beck, Groebenzell; Herbert Ganz; Günther Kuntz, both of Munich, all of Fed. Rep. of Germany

[73] Assignee: AGFA-GEVAERT Aktiengessellschaft, Leverkusen, Fed. Rep. of Germany

[21] Appl. No.: 311,984

[22] Filed: Feb. 16, 1989

[30] Foreign Application Priority Data

Mar. 2, 1988 [DE] Fed. Rep. of Germany ....... 3806630

[51] Int. Cl.⁴ .............................................. F16L 35/00
[52] U.S. Cl. ...................................... 285/24; 285/336; 285/367; 285/351; 285/917
[58] Field of Search ................. 285/336, 410, 112, 24, 285/367, 351, 917

[56] References Cited

U.S. PATENT DOCUMENTS

| 3,464,722 | 9/1969 | Larkin | 285/367 |
| 3,498,649 | 3/1970 | Pfeuffer | 285/336 X |
| 3,544,138 | 12/1970 | Eiff | 285/336 |
| 3,794,361 | 2/1974 | Westberg | 265/336 |
| 4,627,646 | 12/1986 | Kessel | 285/336 X |

FOREIGN PATENT DOCUMENTS

| 134448 | 3/1985 | European Pat. Off. | |
| 2311458 | 9/1974 | Fed. Rep. of Germany | |
| 3249120 | 7/1984 | Fed. Rep. of Germany | |
| 8437061 | 5/1985 | Fed. Rep. of Germany | |
| 286538 | 2/1965 | Netherlands | 285/336 |
| 554512 | 7/1943 | United Kingdom | 285/112 |

Primary Examiner—Dave W. Arola
Attorney, Agent, or Firm—Connolly & Hutz

[57] ABSTRACT

A clamping connection unit for joining two hollow cylindrical pipes together is described. The unit consists of two abutting identically constructed coupling halves (1,2), an elastic O-ring (16) placed between them and a clamping connection (15) pressing the two coupling halves together. The clamping connection is in the form of a pipe clamp and is chamfered off on the internal surfaces of the clamping jaws to form V-shaped surfaces which slide down on similarly chamfered surfaces of annular ridges at the pipe ends to connect the two coupling halves together without leaving a gap.

3 Claims, 2 Drawing Sheets

CLAMPING CONNECTION UNIT

CLAMPING CONNECTION UNIT

This invention relates to a clamping connection unit for releasably clamping together two cylindrical pipes, comprising two abutting coupling halves, one at each pipe end, an elastic sealing ring (O-ring) placed between them and a clamping connection pressing the two coupling halves together.

For connecting pipes or housing parts arranged axially behind one another, it has hitherto been customary to use pipe sections which bridge across the joint in the form of sleeves or flanges pushed over the pipes, or spigots fitting into the pipes. These known arrangements are not only very complicated but also not universally applicable, for example if liquids are pumped through the pipes under pressure.

Pipes connected by screw nuts or tightening screws are disclosed in DE No. 32 49 120 and DE-GM No. 84 37 061, a plug connection with roll sealing rings is described in EP No. 0 134 448 and another threadless connection for pipes is disclosed in DE-OS No. 23 11 458.

As already mentioned, the problem frequently arises of pumping liquid under pressure through pipes as part of a manufacturing process, for example in the chemical industry, or for the transport of foodstuffs. The pipe connection should be easy to separate for cleaning purposes and structural modifications, and existing pipelines should be designed for effective so-called go-devil cleaning, for example with plugs, brushes or scrapers pushed through the pipes under pressure. If liquids such as dispersions containing corrosive solvents, e.g. magnetic dispersions, are to be passed through the pipes, the flange connection between the pipes must be absolutely tight to ensure that the sealing material will not be damaged and dead spaces must be avoided at the flange connections because they would act as harbouring places for the formation of deposits or decomposition products which could give rise to manufacturing breakdown, for example due to the blockage of filters.

The problem therefore arose of finding a clamping connection unit of the generic type described above which would be free from dead spaces, would avoid the disadvantages mentioned above and would be simple to assemble and dismantle.

The invention solves this problem by means of a clamping connection unit having the features of the characterising part of claim 1. Further details of the invention will be seen from the sub-claims, the description and the drawings.

Figure 2:
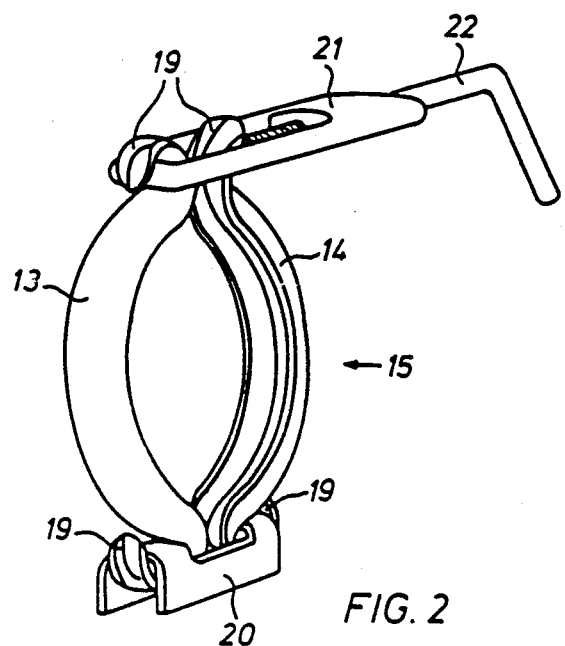
Figure 3:
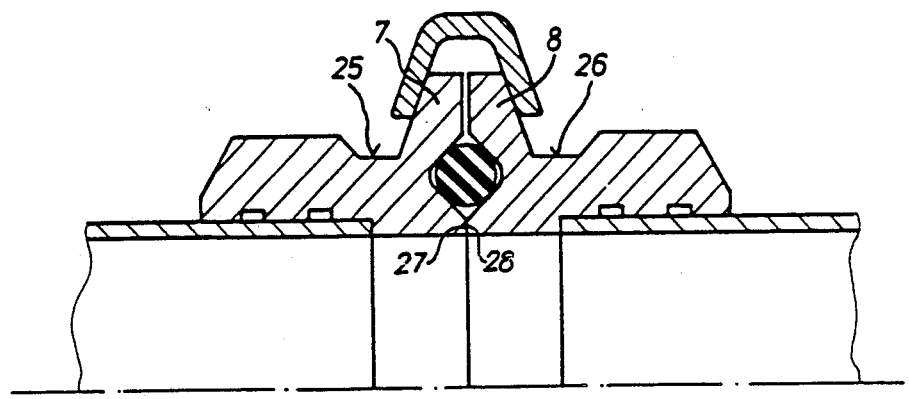

The invention will now be more fully described with reference to the drawings, in which FIG. 1 is a section through a coupling wall with the clamping connection unit according to the invention and pipe ends inserted in position, FIG. 2 is a view in perspective of a conventional commercial form of clamping connection and FIG. 3 shows another embodiment of a clamping connection unit.

It is a characteristic of the present invention that the two coupling halves (1,2) applied to the pipe ends are identical in structure. As shown in section in FIG. 1, each coupling wall has a circular cylindrical annular groove (17,18) situated between the internal surfaces (3,4) and the external surface (5,6) on the otherwise smooth end face. Viewed in axial direction, each groove is V-shaped so that an annular gap which is rectangular in cross-section is formed between the two coupling halves or pipe ends, but the edges of the cross-section at the centre of the coupling halves may be rounded off. An O-ring (16) is inserted as sealing ring in this gap. The pipe ends (23,24) are fitted into corresponding circular cylindrical recesses on the internal surface of the coupling halves. The internal diameters of the pipes have the same diameter as the abutting internal surfaces 3,4 of the coupling halves so that all the internal walls are smoothly adjoining.

On the side situated externally to the pipes, the coupling halves have annular ridges (7,8). The adjacent surfaces (9,10) of these ridges extend radially while the surfaces (11,12) facing away from one another are chamfered off.

The clamping connection is formed by a conventional commercial pipe clamp (15) shown in FIG. 2. In a preferred embodiment, it comprises two clamping jaws (13,14), each in the form of a half ring, with the internal surfaces chamfered off in the form of a V conforming to the chamfered surfaces (11,12) of the aforesaid ridges. Each end of the half ring of the jaw is curved in the form of a hook (19) or eye and two adjacent curved ends are held together by joint clamps (20,21). One of the joint clamps preferably has a bore with a screw thread at one end in which a screw (22) may be turned to press against the curved end (19) to produce the clamping connection. As the two clamping jaws (13,14) are clamped together, their internal surfaces slide down the surfaces (11,12) of the ridges in the radial direction. The coupling halves (1,2) are thereby pressed together against the force of the elastic ring (16) until the two halves of the coupling are in complete gap-free contact on internal contacting surfaces 27 and 28 of the coupling. The radially extending surfaces (9,10) of the ridges (7,8) are still at a slight distance apart when the parts of the clamping unit are pressed together.

The preferred embodiment of tube clamp described above may, of course, be modified without thereby departing from the spirit of the invention. For example, each coupling half may have a trough-shaped recess (25,26) extending in the axial direction from the ridges (7,8) to receive the ends of the clamping jaws when the two halves are pressed together, as shown in FIG. 3.

To enable the two parts of the unit to be easily pressed together, it is an essential feature of this invention that the internal surfaces of the clamping jaws are chamfered off so that they are V-shaped in section to conform to the chamfered surfaces of the ridges so that the coupling halves can be pressed together under a uniform pressure extending over the whole annular surface of the ridges.

The advantages of the clamping connection unit according to the invention may be summarized as follows:

The use of two identical coupling halves avoids the use of a large number of component parts, the two coupling halves are centered by an O-ring fitted into a special double V-shaped O-ring recess, the metallic sealing surfaces are only in contact with each other on the internal contacting surfaces 27 and 28 of the coupling, through which the liquid is transported, so that no elastic sealing material will come into direct contact with the liquid, since the internally situated metal surfaces are sealed off without any gap, the parts are screwed together without leaving any dead spaces, excessively forceful joining together of the coupling halves, which could produce tensions in the pipes, is not possible, the internal pressure of the liquid flowing through the pipes does not act on the screw connection but only on the V-shaped clamp, the clamping connection unit is easy to clean by virtue of its special design, since the various sectors of the sealing arrangement are separate (liquid-metal-elastic seal), it is acceptable to use seals which are not resistant to the liquid flowing through the coupling, and the seal may be used both under conditions of excess pressure and under a vacuum.

We claim:

1. In a clamping connection unit for releasably clamping together two hollow cylindrical pipes, having two abutting coupling halves, one at each pipe end, an elastic sealing ring (O-ring) placed between them and a clamp pressing the two coupling halves together, the improvement comprising two hollow cylindrical coupling halves (1,2) which are identical in structure and are provided with a cylindrical internal wall surface having a diameter substantially equal to the internal diameter of the pipes, said wall surface being provided with a cylindrical recessed portion having a diameter substantially equal to the outer diameter of the pipes so that said cylindrical wall surface and internal surface of the pipes form a smooth connection when the pipes are positioned in said recessed portion, each coupling half having a radial surface extending from the cylindrical internal wall surface, an annular recess (17,18) situated between the internal surfaces of the coupling and external surface of the coupling, said recess being on the radial surface adjacent to the corresponding radial surface of the other coupling half, which annular recess is V-shaped in the axial direction so that an annular gap approximately rectangular in cross-section is formed between the two coupling halves to receive an elastic O-ring (16), ends of the coupling having annular ridges (7,8) on their outer surfaces, said ridges having adjacent and remote surfaces, said adjacent surfaces (9,10) of the two ridges extending perpendicularly to the axis of the pipes and parallel to said radial surfaces and axially displaced therefrom, said surfaces (11, 12) of said coupling halves remote from one another being chamfered off, a clamp having jaws, internal surfaces of said jaws which are chamfered off under the same angle as the chamfered off surfaces of said coupling halves so constructed and arranged that the chamfered off internal surfaces of the clamp slide down the chamfered off surfaces of said coupling halves in the radial direction of said pipes whereby said adjacent radial wall surfaces are pressed toward each other against the force of the O-ring, said coupling halves being engaged in contact with each other solely at said radial surfaces of the coupling between said annular recess and said internal wall surface.

2. Clamping connection unit according to claim 1, characterised in that the clamp is a multipart pipe clamp consisting of two semi-annular jaws (13,14) which are V-shaped on their internal surface and have hooks (19) at each end into which joint clamps (20,21) may be hooked to join the clamping jaws together, at least one joint clamp having a bore with screw thread at one end to receive a screw (22), one end of which acts against a hook (19) on a jaw (14), the clamping jaws pressing the ends of the coupling together by sliding over the chamfered surfaces of the ridges.

3. Clamping connection unit according to claims 1 or 2, characterised in that trough-shaped recesses (25,26) extend in the axial direction from the ridges (7,8) on the external surface of the two coupling halves.

* * * * *